Patented Feb. 2, 1943

2,309,949

UNITED STATES PATENT OFFICE 2,309,949

PREPARATION OF MIXED ESTERS OF POLYHYDRIC ALCOHOLS

Chester M. Gooding, Staten Island, N. Y., assignor to The Best Foods, Inc., New York, N. Y., a corporation of Delaware No Drawing. Application May 23, 1939,
Serial No. 275,154

14 Claims. (Cl. 260—411)

This invention relates to improvements in the preparation of mixed esters of polyhydric alcohols and to the new products resulting therefrom.

In the production of various products from vegetable oils, it has in the past been the practice to select certain oils or mixtures of oils as the starting materials or to treat the oils so as to remove certain fractions which give undesirable characteristics to the finished product. For example, in the production of edible fats known as "hard butters" in the confectionery trade, the fat has been refrigerated and the low melting fractions have been separated by pressing in order to provide a product having a sharp melting point. The hard butter must be firm and dry (relatively free from surface oil under warm weather conditions) and yet not be so hard as to be objectionably chewy and slow melting in the mouth. This pressing operation entails considerable expense in both equipment and labor and, in addition, gives only a 30 to 40% yield of press cake.

It is an object of the present invention to provide an improved procedure for the preparation of mixed esters of polyhydric alcohols. It is also an object to provide such a procedure that is particularly applicable to the rearrangement of the fatty acid radicals in triglycerides of vegetable, animal and fish oils. It also is an object of the invention to provide improved procedures for preparing edible fats and oils and particularly edible fats of the nature of hard butters. Other objects will become apparent.

The present invention involves cross-esterification or the rearrangement of the fatty acid radicals in a mixture of glycerides or other esters of polyhydric alcohols by adding to the reaction mixture small quantities of an alkaline reacting catalyst and a substance containing free hydroxyl groups, and heating the mixture to a suitable reaction temperature, preferably at reduced pressure or while passing a stream of inert gas through it.

It has previously been suggested to react glycerides in the presence of catalysts, but in the absence of free alcoholic hydroxyl groups. The present invention is concerned, however, with an improved procedure in which the cross-esterification takes place in the presence of an alkaline reacting catalyst, together with a relatively small quantity of a catalyst or catalysis promoter that furnishes alcoholic hydroxyl groups.

The cross-esterification by the procedure described may be accomplished in various oils or other mixtures of glycerides and is particularly useful with edible glycerides of fatty acids. In the production of hard butters, glycerides of fatty acids containing 12 to 20 carbon atoms are especially useful. As examples of such glycerides, reference will be made to particular oils or mixtures of oils containing various glycerides, although it will be apparent that it may also be applied to other mixtures of glycerides or to mixtures of esters of glycols or of glycerols and glycols or mixtures of esters of other polyhydric alcohols. The invention may also be used in the cross-esterification of mixtures of esters including polyhydric alcohol esters of the lower fatty acids.

The alkaline reacting material employed as a catalyst may be a fatty acid soap or any substance capable of reacting to form a fatty acid soap of the positive element contained in the alkaline reacting material. For example, sodium soaps or compounds, such as sodium carbonate, sodium bicarbonate, sodium hydroxide, sodium glyceroxide, sodium phenate and trisodium phosphate are all effective in converting mixtures of esters. Reference has been made above to sodium compounds, but corresponding compounds of potassium may also be used for this purpose. Alkaline earth metal compounds, for example, such as calcium oxide and calcium hydroxide or soaps of these, also may be used in place of the alkali metal compounds. In general, however, compounds of the alkaline earth metals are considerably less active than the corresponding alkali metal compounds and higher temperatures or longer times of reaction may be necessary. The catalyst may also be a salt of a lower fatty acid, such as acetic acid. In any event, the compound should be a salt or soap of a fatty acid or a compound capable of reacting at the reaction temperatures employed, to form the corresponding salts or soaps of the fatty acid. It is also important that the resulting salts or soaps of the fatty acids be soluble in or miscible with the reaction mixture at the reaction temperature. It should also be one that will not be lost by vaporization or decomposition under the conditions of reaction.

The hydroxyl carrying material added to the reaction mixture may include a great variety of mono- or polyhydric alcohols. As specific examples of polyhydric alcohols particularly suitable for this reaction, reference is made to glycerol, glycol, propylene glycol, mannitol, and to mono- or diglycerides of fatty acids. Examples of suitable monohydric alcohols are methanol, ethanol, isopropanol, secondary and tertiary butyl alcohols, as well as the higher fatty alcohols, such as cetyl alcohol. In the case of the lower boiling alcohols, it is necessary to carry out the reaction in a closed system under pressure. Such pressure operations may not permit completely anhydrous conditions and hence the reaction is slower and less complete in some instances. It is not intended, however, to limit the alcoholic catalyst or catalysis promoter to the compounds named, since it is obvious that other substances capable of supplying alcoholic hydroxyl groups to the reaction may be used. Examples of such other compounds are alkyl or acyl derivatives of other polyhydric alcohols, such as the lauric acid derivative of mannitol, lower sugars, carbitol (diethylene glycol monoethyl ether) or secondary monohydric alcohols, including secondary monohydric alcohols in which the secondary hydroxyl group occurs as a hydroxy fatty acid, for instance, hydrogenated castor oil (trihydroxy stearin).

When the higher boiling alcohols are used as catalysts, it is desirable to bring about the rearrangement of the fatty acid groups under a vacuum or with a stream of inert gas such as steam, nitrogen, carbon dioxide, etc. The hydroxyl carrying compound added should be one that is not distilled off under such conditions or one that reacts quickly to form a compound that will not be distilled off.

The presence of very small amounts of alcoholic material, for example, glycerine in the proportions of only 0.05% of the weight of the reaction mixture, has been found to hasten the reaction, although in order to obtain the most rapid reaction about 0.5% by weight of the glycerine is preferred. It is not intended, however, to limit the amounts to those given as preferred. Also, the amount required will vary with the molecular weight of the compound in which the hydroxyl group or groups occur. Larger amounts of high molecular weight material will be required to secure a comparable degree of reaction, since it is the concentration of hydroxyl groups that is important. For example, about 0.03 to 1.% by weight of alcoholic hydroxyl groups (about 0.05–2.% glycerol) may be used to advantage, although larger or smaller amounts also may be used. It is preferred to use about .05 to .4% by weight of alcoholic hydroxyl groups.

The amount of alkaline reacting material may also vary, depending upon the particular material used. For example, traces of sodium carbonate, such as 0.02% by weight of the mixture, have been found to give satisfactory results or larger quantities to 1% or more have been found satisfactory where substances, such as sodium stearate, are used. For instance, .05% to 1% of soap or materials sufficient to give that amount of soap have been found to give good results.

The temperature used is determined by the practical requirements in regard to time permitted for the reaction and by the concentration of catalysts to be employed. With higher concentrations of catalyst a lower temperature may be used, although a higher temperature gives a more rapid reaction. Conversely, lower concentrations of catalyst require higher temperatures in order to bring about complete reaction within a reasonable period. In general, it is preferred to use temperatures between 200° C. and 275° C., a particularly useful range for producing hard butters, for example, being between 225° C. and 260° C. The time of the reaction may vary depending upon the conditions employed, but it has been found that the reaction may be accomplished in one to 7 hours at the temperatures given.

The alcoholic material apparently acts in the nature of a catalyst promoter and serves as an intermediate in the rearrangement of fatty acid radicals of the various esters. In the case of mixtures of triglycerides, the reaction may be formulated as follows:

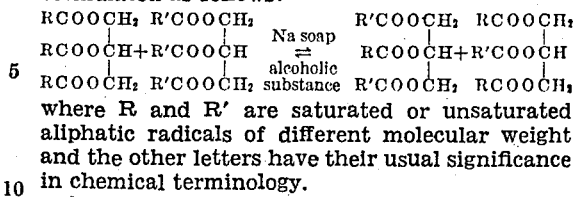

where R and R' are saturated or unsaturated aliphatic radicals of different molecular weight and the other letters have their usual significance in chemical terminology.

Any of the molecular species in the above equation are capable of again exchanging an acyl group with some other molecular species present. It can be seen that the reaction will eventually reach a state of equilibrium and the properties of the equilibrium mixture will be determined by the starting proportions of the reactants.

While the reaction has been referred to as a cross-esterfication, its mechanism appears to be that of successive alcoholytic reactions in which the catalyst promoter furnishes the hydroxyl groups through which the successive alcoholytic reactions take place. It is understood that the foregoing equation and suggested theory are illustrative only and are not intended to describe the limits of the invention.

The following are specific examples of the use of the invention:

*Example 1*

75 parts of palm kernel oil and 25 parts of palm oil were hydrogenated together until the iodin value had fallen to below 0.5. After removal of the hydrogenation catalyst, the mixture was found to have a saponification value of 233.1 and the Wiley melting point of 122.3° F. Instead of hydrogenating the fats comprising their reaction mixture together, they may be hydrogenated separately.

0.6 part by weight of glycerol and 0.07 part by weight of sodium bicarbonate were added and the temperature of the mixture was raised to 240° C. Heating was continued for 3 hours at this temperature while a slow stream of nitrogen was bubbled through the reaction mixture under atmospheric pressure. The product was then refined and deodorized in the usual manner and was found to have a satisfactory color and flavor and to possess a Wiley melting point of 104.5° F. and a setting point of 33.0° C. The oven test showed that the new fat possessed remarkable firmness at temperatures quite close to its Wiley melting point. This product is particularly useful as hard butter for use in the manufacture of confectionery, although it also has many other uses.

The melting point determinations referred to herein were made by the Wiley method for determinations of melting points as described in the Association of Official Agricultural Chemists. "Methods of Analysis" (1935). The setting point determinations referred to herein were made by the procedure described in the Vahlteich et al., Patent No. 2,047,530. The oven tests were made by placing cast blocks of the fat in an oven and observing them periodically while raising the temperature of the oven at a rate of about 1° C. per hour.

It is believed that during the reaction period some of the stearic and palmitic acids of the hydrogenated palm oil migrate to the glycerides of the palm kernel oil and likewise that some of the lauric and myristic acids of the palm kernel oil migrate to the glycerides of the palm oil. In this manner a more homogeneous fat is prepared having greatly improved physical characteristics.

Example 2

23 parts of completely hydrogenated peanut oil and 77 parts of completely hydrogenated coconut oil were heated with mechanical agitation under reduced pressure (1.5 inches of mercury, absolute) with ½ part of glycerol and 1½ parts of sodium stearate. The temperature was maintained at 230° C. for 2½ hours. After refining and deodorizing, the product was found to have a melting point of 107.2° F. and a setting point of 32.5° C., whereas the starting mixture had a melting point of 127.8° F.

Example 3

Completely hydrogenated whole coconut oil was heated at 250° C. with 5% by weight of technical monoglyceride (containing some diglyceride) of coconut fatty acids and ¼% of sodium stearate. During the reaction superheated steam was passed into the reaction kettle maintained under vacuum. At the end of 2½ hours the reaction product was refined and deodorized in the usual way. The melting point was found to have been lowered from 98.8 to 85.3° F. by the procedure described and the setting point had changed from 26.8 to 26.5° C. This product is useful in the manufacture of certain confectionery which requires a fat of somewhat lower melting and setting points than are possessed by the products we have herein referred to as hard butters.

In the several procedures described, the oils or other mixtures of glycerides used were substantially free from free fatty acids having, for example, not more than about 1.5% of free fatty acid. If the free fatty acid content of the glycerides to be reacted is greater than about 1 to 1.5%, a quantity of the alcoholic hydroxy substance equivalent to the excessive free fatty acid should be employed, in excess of that required for its catalyst promoting effect. The soap or other alkaline reacting material used as a catalyst may be separated from the mixed glycerides by settling or filtering, or, preferably, by centrifuging, at slightly above the melting point of the product.

Advantage may be taken of the anhydrous condition of the reaction product to add bleaching earth or carbon (for example, about ½ to 1%) before filtering out the flocculent soap. In some instances a second bleach employing similar quantities of bleaching carbon is advantageous in order to lessen the color of the product to that required by the uses to which it is to be put. In most instances no separate alkali refining step is necessary since very satisfactory results have been obtained by proceeding directly to the final deodorization following the bleaching treatment.

In general, it is preferred to carry out the reaction in an inert atmosphere or in a vacuum. By using superheated steam under an absolute pressure of about two inches of mercury or less, the desired reaction and partial deodorization may be secured. The presence of steam is likely to cause some loss of glycerol by distillation and in such cases a hydroxyl containing substance, such as mono- or diglycerides or other substances that do not volatilize under the conditions of the reaction, may be used to advantage. In the case of volatile compounds, it may be desirable to work under pressure in a closed system for the first part of the reaction or until the volatile components have combined to form less volatile substances. Also, where the use of steam or other inert gas is likely to cause loss of the glycerol or other alcoholic hydroxyl containing material, it may be preferable to operate under a vacuum with mechanical agitation, such as by pumping the mixture to circulate it.

From the preceding examples it will be clear that many modifications and applications of the invention may be made. For example, it is now possible to produce a new type of shortening. Heretofore there have been only two general classes of vegetable shortenings available:

(1) Those composed of two or more fats of different melting points blended in such ratio that the mixture has as nearly as possible the desired physical constants.

(2) Those consisting of a single oil or fat hardened by hydrogenation in order to obtain as nearly as possible the desired physical characteristics.

By the application of the present invention, a third type of shortening is made available, namely, one made by the actual inter-reaction of two or more species of triglycerides. This new shortening differs in its chemical and physical characteristics in that it is made up of molecules which are mixed esters instead of being made up of mixtures of triglycerides present in the various fatty oils used.

The following are examples of the preparation of substances suitable for shortenings:

Example 4

About 90 parts of cottonseed oil stearin and 10 parts of completely hydrogenated cottonseed oil stearin were heated, under vacuum and in a stream of nitrogen, with 0.6 part of glycerol and ½ part of sodium stearate at 255° C. for 3½ hours. After removal of soap by filtering with carbon, the product was found to have a melting point of 109.0° F. and a setting point of 27.1° C. The starting mixture possessed a melting point of 115.0° F. and a setting point of 27.8° C.

Example 5

Red palm oil of a melting point of 111.2° F. and a setting point of 25.6° C. was heated at 260° C. with ½% sodium stearate and 0.6% glycerol in a slow stream of carbon dioxide for 4 hours at atmospheric pressure. The product after refining was found to possess a melting point of 108.9° F. and a setting point of 28.5° C.

The products of Examples 4 and 5 have physical constants which make them eminently suitable for shortenings.

By following this invention, oils may be selected that contain high percentages of fatty acid radicals containing 6 to 12 or 14 carbon atoms and these oils may be mixed with oils containing high percentages of fatty acid radicals containing 16 to 22 carbon atoms and reacted as described above to produce mixed glycerides or other polyhydric esters of the fatty acids. For example, this reaction may be used to obtain plastic coconut margarine oils, whereas until now the use of hydrogenated coconut type oil in margarine has been unsatisfactory because of the brittleness at refrigerator temperatures of a margarine made from coconut type oils. This brittleness acts to reduce spreadability of the margarine. Also, polyhydric alcohol esters of fatty acids of less than 6 carbon atoms may be cross-esterified with those of fatty acids of higher numbers of carbon atoms. For example, tributyrin may be cross-esterified with coconut oil to prepare a synthetic butter fat.

As another example of an ester of a lower fatty acid, triacetin may be caused to cross-esterify with the higher fatty acid glycerides in the presence of a catalyst, such as sodium stearate, and a catalyst promoter, such as glycerol.

The invention may also be used in the manufacture of mixed esters in the production of cosmetics and other substances sold in the drug trade. For example, creams and lip rouges of improved texture may be made from the products of cross-esterification, in accordance with the above disclosures.

The invention described herein may also have many other uses. For example, it may be used together with the partial hydrogenation of fatty acid esters of polyhydric alcohols, whereby intermediate unsaturated radicals such as the isooleic group may be put into the mixed ester.

The terms used in describing the invention have been used as terms of description and not as terms of limitation and it is recognized that various other modifications will be apparent to those skilled in the art.

I claim:

1. A method of preparing mixed esters of polyhydric alcohols, comprising heating mixtures of substantially completely esterified esters of polyhydric alcohols to a temperature of about 225 to 260° C. in the presence of about 0.05% to 1% of a sodium soap and about 0.05% to 2% of glycerol by weight.

2. A method of rearranging the fatty acid radicals in a mixture of substantially completely esterified fatty acid esters of polyhydric alcohols, comprising maintaining the mixture at temperatures of about 200 to 275° C. in the presence of a small quantity of an alkaline reacting alkali metal compound and a quantity of a material capable of supplying alcoholic hydroxyl groups in the proportions of about .03 to 1% by weight of the mixture.

3. A method of rearranging the fatty acid radicals in a mixture of substantially completely esterified fatty acid esters of polyhydric alcohols, comprising maintaining the mixture at temperatures of about 225 to 260° C. in the presence of a small quantity of an alkaline reacting alkali metal compound and a quantity of a material capable of supplying alcoholic hydroxyl groups in the proportions of about .03 to 1% by weight of the mixture.

4. A method of rearranging the fatty acid radicals in a mixture of substantially completely esterified fatty acid esters of polyhydric alcohols, comprising maintaining the mixture at temperatures of about 225 to 260° C. in the presence of a small quantity of an alkaline reacting alkali metal compound and a small quantity of a material capable of supplying alcoholic hydroxyl groups in the proportions of about .05 to .4% by weight of the mixture.

5. A method of rearranging the fatty acid radicals in a mixture of substantially completely esterified fatty acid esters of polyhydric alcohols, comprising maintaining the mixture at temperatures of about 200 to 275° C. in the presence of about .05 to 1.0% of an alkali metal soap and a quantity of a material capable of supplying alcoholic hydroxyl groups in the proportions of about .03 to 1% by weight of the mixture.

6. A method of rearranging the fatty acid radicals in a mixture of substantially completely esterified fatty acid esters of polyhydric alcohols, comprising maintaining the mixture at temperatures of about 200 to 275° C. in the presence of a small quantity of an alkaline reacting alkali metal compound and about .05 to 2% by weight of glycerol.

7. A method of rearranging the fatty acid radicals in a mixture of substantially completely esterified fatty acid esters of polyhydric alcohols comprising maintaining the mixture at temperatures of about 200 to 275° C. in the presence of about .05 to 1% by weight of an alkali metal soap and about .05 to 2% by weight of glycerol.

8. A method of rearranging the fatty acid radicals in a mixture of substantially completely esterified fatty acid esters of polyhydric alcohols, comprising maintaining the mixture at temperatures of about 225 to 265° C. in the presence of about .05 to 1% by weight of an alkali metal soap, and about .1 to .8% by weight of glycerol.

9. A method of preparing an edible mixed glyceride comprising maintaining a mixture of substantially completely esterified glycerides of fatty acids containing 12 to 20 carbon atoms at a temperature of about 225 to 260° C. under a reduced pressure in the presence of about .05 to 1% of an alkali metal soap and a material capable of supplying alcoholic hydroxyl groups in the proportion of about .05 to 1% by weight of the mixture.

10. A method of preparing an edible mixed glyceride comprising mixing an oil containing a relatively large percentage of $C_{12}$ to $C_{14}$ fatty acid radicals with an oil containing a relatively large percentage of $C_{16}$ to $C_{18}$ fatty acid radicals and maintaining the mixture at a temperature of about 225 to 260° C. in the presence of about .05 to 1% of an alkali metal soap and a material capable of supplying alcoholic hydroxyl groups in the proportion of about .05 to 1% by weight of the mixture.

11. A method of re-arranging the fatty acid radicals in a mixture of substantially completely esterified fatty acid esters of polyhydric alcohols, comprising maintaining the mixture at a temperature of about 225 to 260° C. in the presence of about .05 to .50% alkali metal soap and a quantity of a material capable of supplying alcoholic hydroxyl groups in the proportions of about .03 to 1% by weight of the mixture.

12. A method of re-arranging the fatty acid radicals in a mixture of substantially completely esterified fatty acid esters of polyhydric alcohols, comprising maintaining the mixture at a temperature of about 225 to 260° C. in the presence of about .25% sodium soap and about .6% by weight of glycerol.

13. A process of cross-esterifying a substantially neutral mixture of triglycerides to alter the melting and setting points thereof without substantially altering other properties comprising heating said mixture to a temperature of about 200 to 275° C. together with catalytic agents comprising a small quantity of an alkaline reacting alkali metal compound and a quantity of a material capable of supplying alcoholic hydroxyl groups in a proportion of about .03 to 1% by weight of the mixture.

14. A process of cross-esterifying a substantially neutral mixture of triglycerides comprising heating said mixture to a temperature of about 225° C. to 260° C. together with catalytic agents comprising a small quantity of an alkaline reacting alkali metal compound and a quantity of a material capable of supplying alcoholic hydroxyl groups in a proportion of about .03 to 1% by weight of the mixture.

CHESTER M. GOODING.